Patented Mar. 12, 1946

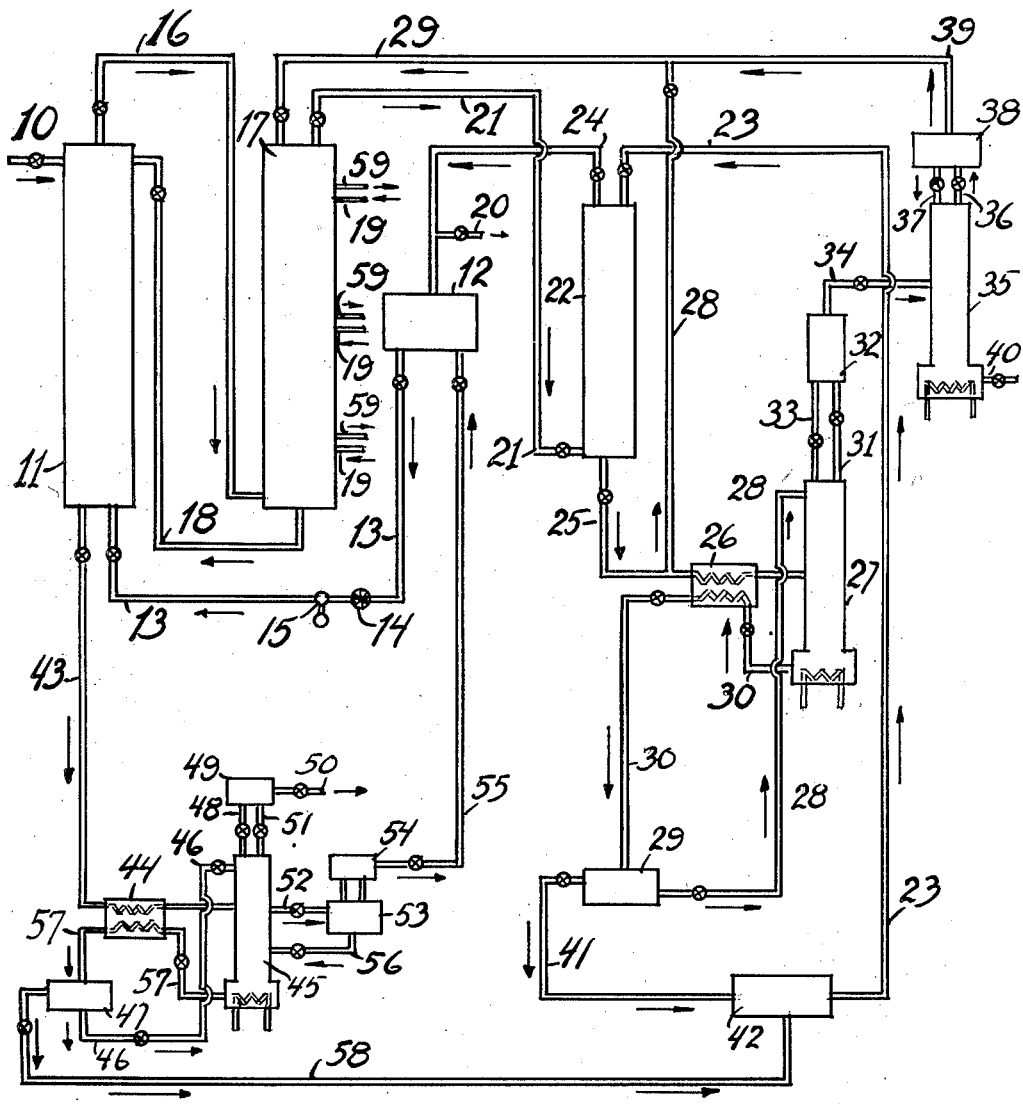

2,396,301

UNITED STATES PATENT OFFICE 2,396,301

REFINING OF MINERAL OILS

George H. Cummings, State College, Pa., William J. Sweeney, Elizabeth, N. J., and Merrell R. Fenske, State College, Pa., assignors of one-half to Standard Oil Development Company, a corporation of Delaware, and one-half to Röhm & Haas Company, a corporation of Delaware Application November 22, 1940, Serial No. 366,739

21 Claims. (Cl. 260—677)

The present invention relates to the refining of mineral oils and is more particularly concerned with the separation and recovery of olefins from feed mixtures containing the same. In accordance with the present process, mineral oils, particularly petroleum hydrocarbon liquids obtained from any source, are treated in a manner under specific conditions to segregate the olefins, utilizing a particularly desirable solvent which comprises ammonia and a substance having the ability to decrease the solvent power of the ammonia within definite critical limits. The present application contains subject matter in common with and is a continuation-in-part of our application Serial No. 353,448, filed August 21, 1940.

Within recent years, the use of olefins in chemical syntheses, to produce polymers as well as pure compounds, has become widespread. This requires the economical separation of olefins from feed mixtures containing the same in a relatively pure state. It is well known in the art that mineral oils such as petroleum oils contain various types of hydrocarbon constituents which may be generally classified as having paraffinic, aromatic, hydro-aromatic or naphthenic, and unsaturated structures which vary over wide ranges in molecular weights. It is also well known in the art to segregate these oils, particularly petroleum oils, into relatively more paraffinic or relatively hydrogen-rich fractions and into relatively more aromatic or relatively hydrogen-poor fractions by means of various selective solvents or solvent mixtures. The separation of the more viscous oils is usually accomplished by means of an organic solvent selected from the class of solvents which have a preferential selectivity for the relatively more aromatic type compounds as compared to the relatively more paraffinic type compounds. Solvents of this class are, for example, phenol, furfural, cresols, nitrobenzene, aniline, beta beta' dichlorodiethyl ether, and the like. When employing these solvents for any given molecular weight it generally follows that in a given solvent or solvent mixture the paraffinic type hydrocarbons are the least soluble, the naphthenes next, and the aromatic and unsaturated hydrocarbons the most soluble. Solvents of this class are employed together as well as in combination with other substances, as for example, with materials of the class of liquefied normally gaseous hydrocarbons such as ethane, propane, butane and the like.

The solvent or solvent mixture and the oil are contacted by various means, as for example, by a batch or by multi-batch processes. However, in general, the conventional procedure is to contact the solvent and the oil in a countercurrent tower treating operation. In this type of operation the lighter phase, usually the oil, is introduced at the middle or bottom section of the tower, while the heavier phase, usually the solvent, is introduced at the upper part of the tower. The respective phases flow countercurrently under conditions adapted to secure optimum contact between the solvent and the oil. Contact between the countercurrently flowing phases is usually secured by suitable distributing and contacting means, as, for example, packed masses, pierced plates, distributing trays, and the like. Temperature and pressure conditions on the tower are adjusted to secure the formation of a solvent-poor or raffinate phase, the oil of which is relatively highly paraffinic in nature, and a solvent-rich or solvent extract phase, the oil of which is relatively highly aromatic in character. The respective phases are separated and handled in a manner to remove the solvent from the extract and the raffinate. This is usually accomplished by a distillation process, providing a sufficient differential exists between the boiling points of the solvent and the oil. Other means are also employed, as, for example, re-extraction with a secondary solvent or by washing with water and the like.

These organic solvents and extraction processes, while entirely satisfactory for securing a separation between the relatively more aromatic constituents and the relatively more paraffinic constituents of an oil such as in an operation for the production of a high quality paraffinic type lubricating oil from a petroleum oil fraction, are not particularly desirable for effecting the separation of olefin constituents from mixtures containing other constituents of a similar chemical structure. This is a disadvantage, since, due to the differences in chemical and physical properties between the paraffinic type constituents, the aromatic type constituents, the hydro-aromatic or naphthenic type constituents, and unsaturated type constituents, each possesses desirable characteristics and each finds certain uses to which the others are not well suited. For example, in the higher molecular weight range, the paraffinic type constituents, due to their stability and low viscosity-temperature coefficient, are unusually well adapted for utilization in lubricating oil fractions. Aromatic type constituents, on the other hand, possess a relatively high viscosity-temperature coefficient and thus have a greater tendency to form sludge-like and similar polymerization products which considerably impair the quality of a lubricating oil. In the lower molecular weight range, the paraffinic type constituents are best adapted for use as illuminants, due to their non-smoking properties, and are also well adapted for employment as commercial solvents. The aromatic type constituents, along with certain naphthenic type and isoparaffinic type constituents, are particularly desirable for incorporation in motor fuels. The unsaturated type constituents, as, for example, the diolefins and mono-olefins, are desirable as feed materials for polymerization and related operations. They are also employed as feed stocks in various chemical syntheses.

In order to segregate particularly desirable olefin constituents from feed oils containing the same, other substances than conventional organic solvents and processes have been proposed. These processes are concerned with operations for effecting a more efficient and economical separation of feed mixtures into their respective constituents according to molecular weight and chemical structure. Particular solvents which have been suggested for securing these results are liquefied normally gaseous inorganic solvents of the character of sulfur dioxide and liquid anhydrous ammonia. However, we have found that sulfur dioxide is subject to limitations in the purity of the olefin extract obtainable even at very low temperatures. Likewise, we have found that liquid anhydrous ammonia as such is not applicable for effecting a satisfactory separation of olefin constituents. This is due largely to its very limited range of solvent power. We have, however, discovered that unexpected desirable results are obtained providing the ammonia solvent be modified in a manner that the amount of olefin constituents dissolved therein is maintained within certain critical limits.

By so operating our solvent is particularly applicable for segregating valuable olefin constituents from feed mixtures containing the same.

In order to secure a clear concept and value of a particular solvent a selectivity factor, termed beta, is employed. This factor is quite analogous to the alpha factor employed in distillation and may be represented by the following formula:

$$\text{Beta} = \frac{Y_A}{Y_B} \times \frac{X_B}{X_A}$$

in which the terms X and Y are used to denote concentrations in the raffinate and extract or solvent phases, respectively, while A and B denote, respectively, the more soluble and less soluble components or portions of the material being extracted. Through the concept of beta the limiting conditions for any separation can be determined as described by Varteressian and Fenske, Ind. Eng. Chem. 29, 270, 1937. Thus, $Y_A/Y_B$ equals the ratio of the more soluble component to the less soluble component in the solvent or extract phase, and $X_A/X_B$ equals the ratio of the more soluble component to the less soluble component in the oil or raffinate phase. Beta is a numerical measure of the solvent's selectivity or the solvent's ability to preferentially dissolve one particular type of constituent to the exclusion of other types of constituents.

It is known that the beta or selectivity of any particular organic solvent may be affected by the addition of other materials to the solvent. Generally as the solvent power of any solvent is increased the selectivity or beta decreases to a marked extent. This is particularly the case when employing liquid sulfur dioxide which is of a character similar to the character of liquid ammonia. Liquid sulfur dioxide even with the use of modifying agents is also subject to other limitations in the purity of extract obtainable, even at very low temperatures.

Organic solvents which have been found satisfactory for lubricating oil extraction and high molecular weight separations, such as phenol, chlorex, furfural, cresylic acid, etc., are unsuitable for the treatment of lighter hydrocarbons, i. e., hydrocarbon fractions boiling below a typical light lubricating oil. It is known that various substances are added to the foregoing and other solvents to obtain more or less improved operation in treating oils and particularly relatively high molecular weight hydrocarbons. In many cases such other substances are added to alter density relationships, thereby facilitating phase separation. They are also added to reduce emulsions. Their effect on the solvent power or selectivity of the particular solvent to which they are added is obscure since the function and choice of such materials depends on their ability to disengage the solvent and oil more rapidly than would otherwise be possible. The selection of such substances also depends on the properties of the solvent and the oil being treated.

In some cases other liquids have been added to a particular solvent in order to alter its solvent power. The effectiveness of these added liquids depends largely on the properties and characteristics of the primary solvent to which they are added. For most of the primary solvents in present use very few modifying solvents may be extensively used due to difficulties experienced with density factors, emulsions, mutual solubility, chemical interaction, corrosion, etc. Some of the combinations in use are accompanied by unforeseen difficulties. For example, when benzol is added to liquid sulfur dioxide to adjust the solvent power of the solvent, the selectivity as measured by beta drops considerably and to an almost prohibitive extent. Adding water to phenol reduces its solvent power for oil. Furthermore the phenol-water mixtures are considerably more corrosive than either phenol or water alone. In some cases there are also emulsion troubles. Very few liquids may be added to furfural and chlorex due to their relatively great chemical reactivity. It is well-known that few, if any, liquids soluble in liquid sulfur dioxide will reduce its solvent power without chemical reaction or causing the corrosion of equipment. Not wholly satisfactory solvent has yet been found for changing the dissolving power of liquid sulfur dioxide without impairment of its selectivity due to the properties of sulfur dioxide. In general, while the principle of modifying solvents for altering solvent power is relatively well understood, their applicability has been greatly restricted due to the disadvantages which their use incurs. These disadvantages include: loss of selectivity, increase in corrosiveness, the production of emulsions, difficulty in separating the modifying solvent from the primary solvent, difficulty in separating the primary solvent or modifying solvent from the hydrocarbon mixture being treated, and incompatibility of the modifying solvent with the primary solvent over a relatively wide range of concentration or hydrocarbon solubility. This is a particular obstacle if more than two products are to be obtained from any solvent treating operation. However, a principal disadvantage of employing a modifying agent to alter the solvent power of a particular solvent is that a loss in the selectivity of the solvent occurs as measured by a lower beta.

Liquid anhydrous ammonia has been proposed for certain specific separations of hydrocarbons particularly in the low molecular weight hydrocarbon range. However, this solvent is not suitable for segregating the olefin constituents of mineral and petroleum oils due to the limited and irregular solubility characteristics of various hydrocarbon constituents in this solvent.

The solubilities of various hydrocarbons in liquid anhydrous ammonia are as follows:

Table 1

[Temperature—110° F. Solvent—liquid anhydrous ammonia]

| Hydrocarbon | Weight per cent solubility in ammonia |
|---|---|
| n-Pentane | 21.2 |
| n-Hexane | 15.2 |
| n-Heptane | 10.0 |
| n-Octane | 6.1 |
| n-Nonane | 4.0 |
| n-Decane | 2.9 |
| n-Hexadecane | 0.2 |
| Cyclohexane | 14.5 |
| Methylcyclohexane | 13.3 |
| 2, 2, 4-trimethylpentane | 10.1 |
| Diisobutylene | 29.5 |
| Toluene | 14.3 at −16° F. |
| Triisobutylene | 5.0 |

The respective miscibility temperatures using equal volumes of various liquid hydrocarbons and liquid anhydrous ammonia are as follows:

Table 2

| Hydrocarbon | Miscibility temperature |
|---|---|
| | ° F. |
| Propane | 83 |
| Propylene | 22 |
| Butadiene | −22 |
| Butene-1 | 41 |
| Isobutene | 43 |
| n-Butane | 106 |
| Trimethylethylene | 73 |
| Pentene-2 | 76 |
| Mixed amylenes | 74 |
| Toluene | 19 |
| o-Xylene | 54 |
| Styrene | 4 |

The above two tables clearly demonstrate that liquid anhydrous ammonia is not a satisfactory solvent for the segregation of olefin constituents due to the wide range of temperatures necessary to obtain a practical solubility of hydrocarbons in the liquid ammonia. We have found that to separate olefins in a substantially pure state and in a practical and economical manner, it is necessary to keep the solubility of dissolved hydrocarbons in the solvent within relatively narrow limits throughout most of the extraction path. Otherwise, excessive solvent-to-oil ratios or extraction stages are needed. Correct control of the solubility is very important in the commercial separation of olefins, for if the solubility in the solvent is too low, particularly at the feed, excessive and uneconomical solvent-to-oil ratios are required to remove a high yield of olefins in the extract and to produce an olefin-free raffinate. For example, we have found in a given separation that the solvent-to-oil ratio could be reduced from twenty-five-to-one to eight-to-one by increasing the solubility at the feed point from five to fifteen per cent. On the other hand, we have found that the selectivity of liquid anhydrous ammonia drops off rapidly when the solubility becomes too high, thus requiring an excessive number of extraction stages. In the same case mentioned above, we found that by increasing the solubility from twenty to thirty-five per cent in the extraction path, the required number of stages was increased by a factor of four. In cases where the feed mixtures contain more constituents than olefins and paraffins this control of solubility becomes of even greater importance. When aromatics, olefins, and paraffins occur in the feed mixture, the olefins are best produced as a side cut. In many such instances it is entirely impossible to separate pure olefins using liquid anhydrous ammonia as the solvent. Furthermore, temperature adjustments alone are not satisfactory expedients for applying this solvent to a variety of olefin separations over a wide molecular weight range. Very low temperatures are uneconomical to produce and in some instances even cause the freezing of certain components of the mixture. High temperatures are equally undesirable, for we have found that the selectivity of liquid anhydrous ammonia decreases appreciably with increases in temperature. Also, in the case of ammonia, high temperatures require high pressures which in turn necessitates expensive and heavy equipment. In extracting hydrocarbon fractions boiling around 200° C. with anhydrous ammonia, the pressures would approach or exceed 600 pounds per square inch. Indeed with this solvent there is an upper limit to the solubility obtainable by temperature increments due to its relatively low critical temperature. If liquid anhydrous ammonia were used for the separation of relatively pure propylene, temperatures as low as −10° F. would be required in at least part of the enriching section. Or, if triisobutylene were being separated from the decanes by this solvent, temperatures as high as 180° F. would be required to remove completely the olefins from the feed. Pressures would then be about 600 pounds per square inch, and at these high temperatures the selectivity has become so low as to make anhydrous ammonia inapplicable to this separation. In neither of these cases could economical separations be made. Furthermore, in order to maintain the solubility of the hydrocarbons in liquid anhydrous ammonia within the range of 5 to 30 per cent, or preferably 10 to 20 per cent throughout the tower as required for efficient and economical extraction, it is necessary to employ a relatively steep temperature gradient due to the wide differences in solubility of olefins and paraffins. These temperature gradients are difficult to obtain and maintain in the present-day commercial extraction units. When the feed mixture contains a relatively low percentage of olefins, for example, below thirty per cent, which is usually the case in commercial practice, it is impossible to secure economical separations of pure olefins with anhydrous ammonia due to the differences in solubility between paraffins and olefins.

It is thus apparent that ammonia is not generally a satisfactory solvent and cannot be used economically for the separation of olefins over a wide molecular weight range due to the fact that its solvent power cannot be readily adjusted so as to lie within a practical range throughout an extraction apparatus.

Furthermore, from the knowledge of prior art it is not to be expected that these inherent disadvantages possessed by liquid anhydrous ammonia could be rectified by methods known to the art. As previously pointed out modifying agents employed in conjunction with organic solvents materially affect the selectivity or beta of the solvent. This adverse effect on the selectivity of the solvent seems to be materially aggravated when employing a solvent selected from the class of liquefied normally gaseous inorganic solvents. For example, benzene when employed in conjunction with sulfur dioxide reduces the selectivity of the sulfur dioxide to a small fraction of its former value. This greatly impairs or prohibits its use in many cases where it would otherwise be very applicable. In fact, no inorganic selective solvent has been proposed to which modifying solvents may be added without critically impairing the selectivity of the solvent.

We have, however, discovered that, providing the solvent comprises ammonia and a modifying agent of the class characterized by having the ability to decrease the solvent power of ammonia which is introduced into at least part of the extraction path, unexpected desirable results are secured. We have discovered that providing the characteristics of ammonia be modified in the manner described with the desired modifying agent it is possible to treat feed oils for the production of olefin constituents which otherwise could not be secured either by the use of ammonia alone or by means of closely related solvents. We have discovered that ammonia is compatible with a variety of substances capable of varying its solvent power for hydrocarbons, that when these modifying solvents for adjusting solvent power over a definite range are used, little, if any, loss in selectivity occurs, and that there is substantially no increase in corrosiveness or in emulsions. Thus, in spite of the fact that no selective inorganic solvent in present use is susceptible to modifying solvents for altering solvent power without some of the previously noted disadvantages occurring, we have discovered that ammonia is compatible with a great many substances without such disadvantages and that by proper choice of modifying solvent, the ammonia solvents may now be used for an economic segregation of olefin constituents.

The amount of solvent modifying agent used may vary widely and will depend on general operating conditions and upon the particular feed stock being treated. Usually it is preferred that the amount of modifying agents is controlled so that about 5 to 30 per cent solubility is secured at the feed point. In general, the solvent mixture should comprise from about 5 to 40 per cent of a modifying agent. Suitable modifying solvents can be chosen from a relatively large group. Any substance which will not react but which when added to the system will decrease the solvent power of the ammonia solvent may be used. As specific examples we might cite water, ethylene glycol, formamide, ethylene diamine, and some aromatic hydrocarbons and paraffinic hydrocarbons to reduce the solvent power. We have found that water, ethylene glycol, the lower molecular weight diamines, and higher molecular weight paraffinic or naphthenic hydrocarbons are especially effective. In some cases, particularly when segregating olefins containing more than six carbon atoms in the molecule, we find it advisable to employ in conjunction with the ammonia and modifying solvent another substance which will tend to increase the solvent power of the ammonia. Such a substance may be chosen from the group: higher glycols, ethers and ether-alcohols, methanol and other alcohols, alcohol-amines, aniline, pyridine, the methylamines and other low molecular weight aliphatic amines.

In general, the solvent in the solvent phase will comprise ammonia in a concentration above about 50 per cent by volume. The selectivity characteristics of the solvent are primarily that of the ammonia; only the solvent power is modified. Hence, it is not necessary that the modifying solvent be selective; it is only necessary that it decrease the solvent power of the ammonia. Our modifying solvents should not be confused with those substances added to ammonia to change its specific gravity in order to afford better phase separation, as for example, inorganic salts. For our modifying solvents, on the other hand, the primary requisite is that they decrease the solubility of the hydrocarbon in the solvent, without adversely affecting the beta and they are chosen primarily on the degree that they do this.

The amount of modifying solvent added depends upon the degree to which the solvent power should be changed, and hence upon the mixture being extracted and the particular modifying solvent used. Water is very potent in changing the solvent power and in general should not be used in concentrations above about 25 per cent. Ethylene glycol is most satisfactory in concentrations below 40 per cent. The ammonia and the modifying solvent may partition themselves between the extract and raffinate phases in a different concentration ratio. As a result, when countercurrent treating operations are being employed, the composition of the solvent may change along the countercurrent path. In general, this composition change will have a beneficial effect, for the solvent usually decreases in solvent power because of this change as it flows through the countercurrent extraction path. This effect aids in maintaining the solubility at a more constant value, and leads to more efficient extraction.

It is not necessary that the modifying solvent be completely soluble in the liquid ammonia. A highly-refined paraffinic or naphthenic neutral oil may be added to lower the solubility in the solvent. A highly paraffinic oil is quite effective. For example, although isobutylene is normally completely soluble in liquid ammonia at all temperatures above 43° F., we have found that by adding less than one part of a paraffinic oil to an ammonia-isobutylene mixture at 80° F. the isobutylene dissolves to the extent of less than ten per cent. The paraffinic oil occurs almost entirely in the raffinate phase. In general, we prefer to use proportions such that the paraffinic oil is present in minor molecular proportions, that is, such that it acts as a substance to modify the solvent power rather than as a solvent itself. The use of such oils is particularly desirable when extracting low molecular weight olefins, i. e., those below 100, and especially when employing countercurrent extraction wherein the solubility is adjusted at several points in the extraction path by the addition of such oils. Low molecular weight paraffinic hydrocarbons such as propane are suitable modifying solvents. Toluene is also effective. When the solubility is adjusted by their use the selectivity as measured by beta is not substantially affected. Thus, many separations are now possible that heretofore were impossible.

These modifying solvents may be added directly to the ammonia, or they may be added to a countercurrent treating system at several points. We have found the addition of the modifying solvent at one or more points in a countercurrent extraction path to be particularly effective. In this way the solubility is controlled so as always to be within the proper limits in order that the selectivity or beta may be high. It is frequently much more feasible and practical to control the solubility in this way than in other ways, for example, by changing the temperature.

The present process may be used for the segregation of olefins from any feed oil. In general, we have found it to be particularly adapted in the treatment of oils boiling in the range below the boiling range of light lubricating oil fractions. It is particularly applicable in the segregation of olefins from low viscosity or non-viscous oils having molecular weights in the range of from about 25 to about 200.

Operating temperatures and pressures may vary considerably. Under certain conditions the temperatures may be in the range from about 0 to 150° F. However, due to the particular nature of the solvent it is preferred that the temperatures be in the range from about 40° to 100° F. The pressures in general should be sufficient to maintain all the constituents in the liquid state and may be adjusted to regulate the solubility of the constituents in the solvent. In general, it is preferred that the pressures be in the range from about 50 to 200 pounds per square inch gauge.

The solvent-to-oil ratio will depend upon the mixture being treated and on the solubility in the solvent. As indicated, the solubility should be controlled so that the amount of oil dissolved is within a certain critical range, in order that the solvent be effective and in order that a practical commercial operation be secured. Effective and practical operation is considered to be a reasonably low solvent-to-oil ratio, for example, less than 10 to 1, a relatively low number of theoretical extraction stages required, for example, less than 25, ample control of solubility and phase separation together with the ability to produce any desired degree of purity and if necessary approaching 100 per cent purity for the extractable materials in a high yield. The feed rate will be a function to a large extent of the specific feed mixture and the solvent-to-oil ratio.

In the segregation of substantially pure olefins by our process, it is usually desirable to use two extraction zones, that is, a stripping zone in which the olefins are preferentially removed from the hydrocarbon feed constituents, and an enriching zone in which the olefins are purified by the removal of any paraffins which are dissolved in the extract in the stripping zone. In operations in which the concentration of olefins in the feed is relatively low and the feed is of somewhat higher molecular weight, it is sometimes desirable to add a substance, such as methylamine, to the ammonia in the stripping section in order to raise the solvent power to remove substantially all the olefins without an unduly high solvent-to-oil ratio and then to modify the solvent in the enriching section to reduce the dissolving capacity back to the point where the pure olefins are not completely miscible with the solvent.

In order to illustrate further the invention the following examples are given which should not be construed as limiting the same in any manner whatsoever.

EXAMPLE 1

A feed oil containing 25 per cent propylene in propane was extracted at 100° F. using an ammonia-ethylene glycol solvent and utilizing glycol injection along the extraction path. The concentration of glycol was about 30 per cent at the extract end of the tower. When the feed was introduced near the mid-point of the extraction tower and a solvent-to-oil ratio of 10/1 employed, there were obtained as products 98 per cent propylene and 98 per cent propane.

EXAMPLE 2

A feed oil containing 30 per cent butylenes in butanes was extracted at 80° F. with ammonia and a highly paraffinic oil. A solvent-to-oil ratio of 10 to 1 was employed and about half this quantity of the highly paraffinic oil was introduced so that it flowed through the enriching section of the tower. Under these conditions a 98% pure butylene extract is obtained. The raffinate contained only 2 per cent of the butylenes.

EXAMPLE 3

In the extraction of amylenes from the pentanes, a solvent comprising ammonia and up to 35 per cent ethylene diamine at 80° F. was employed. With this solvent there were obtained results similar to those outlined for the other olefins.

EXAMPLE 4

In the extraction of the hexenes from the hexanes when the olefin concentration was 20 per cent, it was found that it was desirable to add eight per cent monomethylamine to the ammonia in the stripping section so that substantially all the olefins could be removed from this section at 80° F. with a solvent-to-oil ratio of 10 to 1. In the enriching section water was injected along the solvent path so that the solvent composition at the extract end was eight per cent water, seven per cent monomethylamine and 85 per cent ammonia. A highly paraffinic oil was also employed in the extraction system. Under these conditions the segregated olefins were obtained in a purity of 95 per cent. The paraffins obtained were also 95 per cent pure.

The process of the present invention may be widely varied. The solubility of the individual components in a given ammonia solvent is dependent not only upon the type of the component, but also upon its molecular weight. In a given type, the lower molecular weight compounds are in general more soluble. For example, we have found that the amylenes are completely soluble in an ammonia solvent at 80° F., whereas the octenes dissolve to the extent of 30 per cent. n-Octane at this temperature dissolves in this solvent to the extent of 6 per cent, whereas the corresponding solubilities for n-pentane and n-butane are 21 and 30 per cent, respectively.

These properties of the ammonia solvents broaden their use in some instances, but restrict them in others. For example, these solvents may be used to prepare isobutylene as a substantially pure extract, while any polymerization products would be rejected in the raffinate. On the other hand, the feed oil must not be too broad in molecular weight, as otherwise the lighter paraffins and naphthenes would have the same solubility as the heavier olefins. In extracting a cut containing from 4 to 10 carbon atom hydrocarbons, some isobutane and cyclopentane would be dissolved along with the diisobutylenes. Hence pure olefins would not be obtained. In general, we prefer that the molecular weight range of the feed oil be within 15 to 30 units.

Due to this molecular weight effect on solubility in the ammonia solvents, it is impossible to define the amount of modifying solvent required without first specifying the composition of the feed oil. Our procedure for carrying out extractions has been to choose a desirable temperature, then determine the amount of modifying solvent or solvent composition required to control the solubility of the extractable components to about 25%. It is preferred to use slightly higher dissolving capacity of solvent in the stripping sections and to adjust the dissolving power of the solvent to about the above determined amount in the enriching section. When this procedure is carried out, the olefins may be effectively and completely freed of naphthenes and paraffins of similar molecular weight range.

The concentration of the modifying solvent will depend upon the particular modifying solvent employed and upon the character of the feed oil. For example, we have found that when the solvent comprises ammonia, water and monomethylamine, the solvent composition should be approximately as shown by the following examples when at ordinary temperatures it is desired to remove in the solvent extract the constituents of the feed above the solid line. The number of carbon atoms in the molecule is designated by the subnumerals.

feed mixture is preferably aromatic and diolefin-free. Further, for obtaining olefins of maximum purity directly from our extraction process, we prefer to extract mixtures of a relatively narrow molecular weight range, and a range of 15 to 30 units in molecular weight is usually satisfactory.

In case aromatics are present along with the olefins in the mixture to be separated, our process is particularly applicable to segregating simultaneously the aromatics from the olefins, and the olefins from the more saturated components of the feed, for, according to our invention, the solubility of each of these hydrocarbon types may be maintained at values to make such a separation very practical. For example, if a hydrocarbon mixture of 90 to 140 molecular weight range containing aromatics and olefins along with more saturated hydrocarbons such as naphthenes and paraffins is to be concentrated, we prefer to segregate the aromatics at the end of the enriching section, using an ammonia solvent of reduced dissolving power, while at the end of the stripping section a raffinate reasonably free of both aromatics and olefins is withdrawn, this raffinate having been extracted in the stripping section with an ammonia solvent of enhanced dissolving power. At some point between the above-mentioned extract and raffinate ends of

*Feed analysis*

|  | Feed | | | | | | | | | | | | | | |
|---|---|---|---|---|---|---|---|---|---|---|---|---|---|---|---|
|  | I | II | III | IV | V | VI | VII | VIII | IX | X | XI | XII | XIII | XIV | XV |
| Aromatics | $C_{11}$ | $C_{11}$ | $C_{11}$ | | | | $C_8$ | $C_8$ | $C_8$ | | | | | | |
| Diolefins | $C_{10}$ | $C_{10}$ | $C_{10}$ | $C_{10}$ | $C_{10}$ | | $C_7$ | $C_7$ | $C_7$ | $C_7$ | $C_7$ | | $C_4$ | $C_4$ | |
| Olefins | $C_{12}$ | $C_{12}$ | $C_{12}$ | $C_{12}$ | $C_{12}$ | $C_{12}$ | $C_8$ | $C_8$ | $C_8$ | $C_8$ | $C_8$ | $C_8$ | $C_5$ | $C_5$ | $C_5$ |
| Naphthenes | $C_{11}$ | $C_{11}$ | $C_{11}$ | $C_{11}$ | $C_{11}$ | $C_{11}$ | $C_7$ | $C_7$ | $C_7$ | $C_7$ | $C_7$ | $C_7$ | $C_4$ | $C_4$ | $C_4$ |
| Paraffins | $C_{12}$ | $C_{12}$ | $C_{12}$ | $C_{12}$ | $C_{12}$ | $C_{12}$ | $C_9$ | $C_9$ | $C_9$ | $C_9$ | $C_9$ | $C_9$ | $C_5$ | $C_5$ | $C_5$ |
| $NH_3$ | 85 | 75 | 60 | 75 | 60 | 60 | 95 | 85 | 75 | 85 | 75 | 75 | 85 | 92 | 92 |
| $H_2O$ | 5 | 5 | 5 | 5 | 5 | 5 | 5 | 5 | 5 | 5 | 5 | 5 | 15 | 8 | 8 |
| Methyl amine | 10 | 20 | 35 | 20 | 35 | 35 | | 10 | 20 | 10 | 20 | 20 | | | |

When segregating olefins containing 6 to 12 carbon atoms in the molecule it is preferred to employ tower-like stripping and enriching sections. For extraction at about 80 to 100° F. it is desirable to use ammonia containing about 10 per cent monomethylamine in the stripping section and to add a minor proportion of water of about 5 to 10 per cent, to this solvent from the stripping section to comprise the solvent used in the enriching section. Under certain conditions it is also desirable to use minor molecular proportions of a saturated type oil in order to control further the solubility of the olefin in both the stripping and enriching sections.

Our invention may be adapted to separate other groups of compounds containing the olefinic linkage from those which do not contain it. For example, aromatics containing olefinic side chains can be separated from aromatics with paraffinic side chains. We have been able to separate styrene in a high degree of purity from mixtures of styrene and o-xylene or other xylenes and ethylbenzene. This separation was carried out at normal temperatures employing ammonia together with water as the solvent.

It should be emphasized that an aromatic or diolefin hydrocarbon of approximately the same molecular weight as an olefin are more soluble in our ammonia solvents than the olefin. Consequently, if olefins are to be the principal or main extraction product produced by our process, the the extraction system, the olefins will be concentrated. This point is selected where the olefins contain some aromatics, but are otherwise relatively free of the more saturated hydrocarbons that comprise the main raffinate flowing out of the end of the stripping section. This olefin concentrate is withdrawn and simultaneously extracted with an ammonia solvent having a higher dissolving capacity than that used in the enriching section wherein the aromatics are being segregated. This solvent, used for extracting the olefin-rich concentrate, dissolves out the aromatics, allowing the olefins to be produced as a raffinate from this stripping operation. This ammonia solvent, containing aromatics together with some olefins, is then returned to the main extraction apparatus at a point near the withdrawal point of the olefin-rich layer. This type of extraction operation is known as side-stream processing. Its use permits the preparation of main extract and raffinate portions together with another portion whose solubility is between that of the extract and raffinate portions. This operation is particularly usable in our solvent process, for its use depends primarily on being able to control the solubility so that all three products can be simultaneously prepared in a straightforward and economical manner.

In another type of side stream processing we prefer to separate at least a part of the solvent-rich phase at a point in the extraction system where this phase contains olefins and dissolved components of lesser solubility. This separated phase is then treated in an enriching operation so as to produce as the extract therefrom the olefinic hydrocarbons. The raffinate is then returned to the main extraction system at a point near that where the solvent-rich phase was first withdrawn.

Instead of the foregoing descriptions being concerned with aromatic, olefin- and saturated-hydrocarbons, it may also describe the segregation of diolefins, olefins and saturated hydrocarbons in a simultaneous manner if, instead of aromatic above, the word diolefin be inserted. The simultaneous separation of diolefins and olefins from saturated hydrocarbons is a particularly desirable operation, for these unsaturates frequently occur together, yet their proper utilization may require them to be relatively pure and free from other hydrocarbon types.

In order to further illustrate the invention, one method of carrying out the same is illustrated in the accompanying drawing. For the purpose of illustration it is assumed the feed consists of 25 per cent isobutylene in butane and that the solvent comprises ammonia and a highly paraffinic oil.

The hydrocarbon feed mixture is introduced by means of line 10 into extraction tower 11. The feed is introduced into the top of tower 11 although an intermediate feed point may be used. Extraction tower 11 may comprise any suitable countercurrent phase contacting devices, equipped with suitable heating and cooling devices so that the temperature may be controlled at any desired level or temperature gradients secured. For this specific case it is assumed that the temperature is controlled at about 75° F. The solvent is taken from storage tank 12 by means of line 13, valve 14 and pump 15 and introduced into the bottom of tower 11. A solvent-to-oil ratio of about ten-to-one is employed.

The extract phase, comprising the solvent and substantially all the isobutylene and some of the butanes, is removed from tower 11 by means of line 16 and introduced near the bottom of extraction tower 17. The raffinate phase is removed from the bottom of this tower and introduced into the top of tower 11 by means of line 18. It is preferred to use a temperature gradient in tower 17 of from 75° F. at the bottom to 50° F. at the top. In certain operations instead of a temperature gradient it is desirable to inject water at points 19 in order to adjust the solubility. In this operation being employed, the solvent returning to storage tank 12 would be by-passed by means of line 20 and treated in any desirable manner to remove the water which had been injected.

The extract phase, comprising solvent and substantially pure isobutylene is removed from tower 17 by means of line 21 and sent to the bottom of solvent recovery tower 22. This tower is similar in construction to towers 11 and 17, and is operated at a constant temperature of about 50° F. Here the extract phase is contacted with substantially an equal proportion of a highly paraffinic oil which is introduced into the top by means of line 23. The added oil removes substantially completely the dissolved hydrocarbon from the solvent. The pure solvent is then taken to storage tank 12 by means of line 24. The added paraffinic oil containing all the hydrocarbon and some ammonia is removed from the bottom of tower 22 by means of line 25, and sent through heat exchanger 26 to distillation column 27. Heat is supplied to the bottom of this column which vaporizes all the ammonia and hydrocarbon and boils the water which strips the added paraffinic oil. Water is introduced from settler 29 by means of line 28. Vapors from the top of column 27 are removed by means of line 31 and passed to partial condenser 32. This condenser is run at such a temperature that all the water is refluxed and returns to tower 27 by means of line 33. The hydrocarbons together with the ammonia are taken overhead by means of line 34 and passed to distillation tower 35. Some additional heat is supplied to the bottom of this tower. The product from the bottom of this tower is substantially pure isobutylene which is removed by means of line 40. The excess hydrocarbons together with all the ammonia are passed to condenser 38 by means of line 36 where they are totally condensed. Part of the condensate is returned by means of line 37 as reflux. The remainder is taken by means of lines 39 and 29 to the top of extraction tower 17 where it is returned as reflux. The residue from the bottom of distillation column 27, comprising the paraffinic oil and water is removed by means of line 30 and passed through heat exchanger 26 to settler 29. The water layer is returned to the column by means of line 28 while the paraffinic oil is returned by means of line 41 to storage tank 42. From here it is taken to solvent recovery tower 22 by means of line 23. Part of the paraffinic oil containing hydrocarbon constituents and some ammonia which is removed from the bottom of this tower is taken by means of lines 28 and 29 to the top of extraction tower 17 where it serves as a modifying solvent for the ammonia.

The raffinate removed from the bottom of extraction tower 11 comprises substantially pure butanes together with a little ammonia and the paraffinic oil which was not previously removed. The raffinate is passed by means of line 43 through heat exchanger 44 to distillation column 45. This column is similar in construction and function to tower 27. Heat is supplied to the bottom which vaporizes all the hydrocarbon and ammonia and boils the water in the still which strips the paraffinic oil. Water is introduced into this tower from settler 47 by means of line 46. The water serves to return any ammonia so that pure butane vapors are taken overhead by means of line 48 to condenser 49. The pure hydrocarbon product comprising butane, is removed by means of line 50. Some of the condensed vapors are returned by means of line 51 as reflux, together with any water which may have distilled over. A liquid phase is withdrawn from a point 52 in tower 45 so that when it is distilled in still 53, substantially pure ammonia is obtained. This is condensed in condenser 54 and returned to storage tank 12 by means of line 55. If desired, part of the condensate may be returned to 53 as reflux. The residue from 53 is returned to 45 by means of line 56. All the ammonia is removed in this way.

The residue from column 45 consisting of paraffinic oil and water is removed by means of line 57, passed through heat exchanger 44 to settler 47. The water layer is returned to tower 45 by means of line 46. The paraffinic oil is returned to storage by means of line 58.

A method for controlling the solubility in tower 17, alternative to temperature gradients and water injection, is by control of the amount of paraffinic oil in the raffinate phase. Part of the raffinate phase may be removed at one or more points 59 along the extraction path and stripped of the components being extracted which are returned to the tower at points 19. The paraffinic oil is returned to storage tank 42. By control of the amount of paraffinic oil removed at these points, excellent adjustment of the solubility results.

While the preceding discussion has illustrated the use of the present invention adapted in extraction towers, its application is in no manner limited to towers alone. Mixers and settlers could be used with equal effectiveness, as well as any other phase-contacting devices. Our solvents are also applicable to other processes than the countercurrent ones illustrated here. Batch, multiple batch, concurrent, or any other familiar to those skilled in the art could be used equally well. The ammonia solvent may be applied to processes to produce several final products instead of the usual two. Adjustment of the solvent power to produce these extra portions by precipitation or by further solution is especially applicable. The products may be re-extracted with ammonia solvents of the same or different compositions, or any other devices known to enhance separation with other solvents, such as temperature gradients, reflux, etc., are in general applicable to these new solvents.

The following definitions relate to the claims and the preceding specification.

Ammonia solvent means liquid ammonia together with a modifying solvent.

The term methylamine is used to denote mono-, di-, trimethylamine, or mixtures of these.

By a modifying solvent we mean any liquid which when added to the system will alter the solvent power of the ammonia. The modifying solvent may or may not be a selective solvent, its determining characteristic being only that it will alter the dissolving capacity of the liquid ammonia.

The term zone denotes one or more extraction stages or the equivalent which are properly interconnected, as already demonstrated, wherein continuity of flow and control of operating variables are maintained. By a first zone we mean that portion of the extraction path between which the feed oil enters and the raffinate phase leaves the system. By a second zone we mean an extraction path along the line of solvent flow beyond the point of feed oil introduction.

Relatively high dissolving capacity means the ammonia solvent dissolves the extractable component or components to a considerable degree, if not completely, and such a solvent is capable of dissolving appreciably the raffinate portions or components. Relatively low dissolving capacity means the ammonia solvent is incompletely miscible with the extractable component or components, and the solubility of such materials in the solvent is usually 20 to 30 per cent or lower, while the raffinate portions or components are relatively insoluble, i. e., the solubility of such material is of the order of 3 to 10 per cent or less.

By mineral oil we mean mixtures that are predominantly hydrocarbons, such as exist in petroleum or its fractions, or predominantly hydrocarbon mixtures obtained by processing such fractions.

The present invention is not to be limited by any theory or mode of operation but only in and by the following claims in which it is desired to claim all novelty in so far as the prior art permits.

We claim:

1. A process for the segregation of a mono-olefin of molecular weight less than about 250 from a mixture of saturated and unsaturated hydrocarbons and a mono-olefin containing constituents of similar boiling points, which comprises extracting in an extraction system a feed mixture with a solvent consisting of liquid ammonia together with a minor proportion of a liquid modifying solvent soluble in liquid ammonia selected from the class of substances which are characterized in that they reduce the dissolving capacity of the ammonia for said feed mixtures, under conditions to form a raffinate phase relatively free of a mono-olefin and a solvent extract phase relatively rich in the mono-olefin, controlling by the amount of said modifying solvent in the ammonia the concentration of hydrocarbons dissolved in the solvent between the limits of 5 to 30 per cent by weight, separating the phases and removing solvent therefrom.

2. A process as defined by claim 1 in which the modifying solvent is water.

3. A process as defined by claim 1 in which the modifying solvent is a low molecular weight diamine.

4. A process as defined by claim 1 in which the modifying solvent is a low molecular weight glycol.

5. A process as defined by claim 1 in which a hydrocarbon, selected from the class of hydrocarbons which are substantially more soluble in the raffinate than in the extract phase, is added to the extraction system.

6. A process defined by claim 1 in which the concentration of modifying solvent in the ammonia is between about 5 and 30 weight per cent based on the ammonia.

7. A process as defined by claim 1 in which the said feed mixture comprises butylenes and saturated hydrocarbon constituents of approximately the same boiling range, and in which the extraction is conducted at a temperature in the range from about 40° F. to 100° F.

8. A process for the segregation and recovery of mono-olefin constituents of average molecular weight less than about 250 from relatively narrow boiling hydrocarbon mixtures containing the same together with more saturated constituents, which comprises extracting the feed mixture with a solvent consisting of liquid ammonia, a modifying solvent which reduces its solvent power for said mono-olefins and a minor molecular proportion of a relatively saturated mineral oil of different boiling range from that of the feed mixture, under conditions to form a raffinate phase and a solvent extract phase, controlling the amount of hydrocarbons dissolved in the solvent phase between the limits of 5 to 30 per cent by weight by the amount of modifying solvent present in the solvent, separating the phases and removing the solvent therefrom.

9. A process defined by claim 8 in which the solvent comprises aqueous ammonia and a minor proportion of a relatively saturated mineral oil of different boiling range from that of the feed mixture.

10. A process for the segregation and recovery of mono-olefin constituents containing from 3 to 6 carbon atoms in the molecule from relatively narrow boiling liquid hydrocarbon feed mixtures containing the same together with more saturated constituents, which comprises contacting the feed mixture with a solvent consisting of liquid ammonia and from 5 to 30 weight per cent based on the ammonia of a substance selected from the class of liquid substances which are characterized in that they reduce the dissolving capacity of the ammonia for mono-olefins, under conditions to form a raffinate phase relatively free of olefins and a solvent extract phase relatively rich in olefins, controlling the concentration of hydrocarbons dissolved in the solvent phase between the limits of 5 to 30 per cent by weight by the amount of modifying solvent present in the ammonia separating the phases, and removing the solvent therefrom.

11. A process in accordance with claim 10 in which said substance is water.

12. A process in accordance with claim 10 in which the said solvent mixture contacts the feed oil in the presence of a substance having the ability to increase the solvent power of the ammonia.

13. A process in accordance with claim 10 in which said solvent mixture contacts the feed oil in the presence of methylamine.

14. A process for the segregation and recovery of mono-olefins of average molecular weight less than about 250 from relatively narrow boiling hydrocarbon mixtures containing the same together with more saturated constituents, which comprises extracting the feed mixture under conditions to form a raffinate phase relatively free of olefins, and a solvent extract phase relatively rich in olefins, with a solvent consisting of liquid ammonia, from about 5 to 15 weight per cent of water based on the ammonia, and a paraffinic oil with a boiling range different from that of the feed mixture, controlling the concentration of hydrocarbons dissolved in the solvent phase between the limits of 5 to 30 per cent by weight by the amount of said water and paraffinic oil present in the system, separating the phases and removing the solvent therefrom.

15. A process for the segregation of mono-olefins of average molecular weight less than about 250 from relatively narrow boiling hydrocarbon feed mixtures containing the same together with more saturated constituents, which comprises introducing a feed mixture at an intermediate point in a countercurrent treating path, introducing liquid ammonia into the end of the countercurrent treating path adjacent the point where the raffinate phase is withdrawn, countercurrently contacting the feed mixture and solvent under conditions to form a solvent extract phase relatively rich in olefins, and a raffinate phase relatively free of olefins, introducing a liquid modifying solvent soluble in ammonia that reduces the dissolving capacity of the ammonia solvent for mono-olefins at at least one point between the point where the feed mixture is introduced into said path and a point near the end of the path from which the solvent extract phase is withdrawn, controlling the concentration of hydrocarbons dissolved in the solvent extract phase between the limits of 5 to 30 weight per cent by the amount of modifying solvent added, withdrawing the respective phases from the respective ends of the countercurrent treating path, and recovering the olefins.

16. A process as defined by claim 15 in which the modifying solvent is water.

17. A process in accordance with claim 15 in which the solvent having the ability to reduce the dissolving capacity of the ammonia is present in a concentration of about 5 to 30 weight per cent based on the ammonia.

18. A process in accordance with claim 15 in which from 5 to 30 weight per cent methylamine, based on the ammonia, is present in the ammonia solvent used in the countercurrent treating path located between the point where the feed is introduced and the point where the raffinate phase is withdrawn.

19. A process for the segregation of mono-olefin constituents containing from 6 to 12 carbon atoms in the molecule from more saturated hydrocarbon constituents of a feed mixture, which comprises extracting the said mixture with a solvent consisting of liquid ammonia and from 5 to 30 weight per cent based on the ammonia of methylamine, and to which is added in at least part of the extraction path from 5 to 40 weight per cent based on the ammonia of a substance that reduces the solvent power of the ammonia solvent and controlling the concentration of hydrocarbon dissolved in the solvent between the limits of 5 to 30 weight per cent by the amount of said substance added.

20. A process for the segregation of mono-olefins of average molecular weight less than about 250 from a relatively narrow boiling hydrocarbon feed mixture containing components some of which are more soluble and some of which are less soluble in the solvent than the mono-olefins, which comprises introducing the feed mixture at an intermediate point in a countercurrent treating path comprising a stripping and an enriching zone, introducing a solvent consisting of ammonia and a modifying solvent soluble in liquid ammonia which reduces the solvent power of said ammonia into the end of the countercurrent treating path adjacent the point of raffinate phase withdrawal, countercurrently contacting the feed mixture and controlling by addition of modifying solvent the solvent power of the ammonia solvent so that the concentration of hydrocarbon dissolved in the solvent is between the limits of 5 to 30 weight per cent and so that the most soluble components are segregated at the end of the enriching section in the extract phase and the least soluble components are segregated at the end of the stripping section as a raffinate phase, further separating at least part of one of the phases at such an intermediate point in the extraction path that the separated phase contains only mono-olefins and components of greater solubility than the mono-olefins, and further extracting said separated phase to purify the mono-olefins.

21. A process for the segregation of mono-olefins of average molecular weight less than about 250 from a relatively narrow boiling hydrocarbon feed mixture containing components some of which are more soluble and some of which are less soluble in the solvent than the mono-olefins, which comprises introducing the feed mixture at an intermediate point in a countercurrent treating path comprising a stripping and an enriching zone, introducing a solvent consisting of ammonia and a modifying solvent soluble in liquid ammonia which reduces the solvent power of said ammonia into the end of the countercurrent treating path adjacent the point of final raffinate phase withdrawal, countercurrently contacting the feed mixture and controlling by addition of modifying solvent the solvent power of the ammonia solvent so that the concentration of hydrocarbon dissolved in the solvent is between the limits of 5 to 30 weight per cent and so that the most soluble components are segregated at the end of the enriching section in the extract phase and the least soluble components are segregated at the end of the stripping section as a raffinate phase, further separating at least part of one of the phases at such an intermediate point in the extraction path that the separated phase contains only mono-olefins and components of lesser solubility than the mono-olefins, and further extracting said separated phase to purify the mono-olefins.

GEORGE H. CUMMINGS.
WILLIAM J. SWEENEY.
MERRELL R. FENSKE.